(No Model.)  3 Sheets—Sheet 1.

F. H. WALTON.
ROTARY LAWN RAKE.

No. 604,812. Patented May 31, 1898.

Witnesses:
Hugo Clark
J. S. Baker

Inventor.
Frederick H. Walton
by P. W. J. Lander,
His Atty.

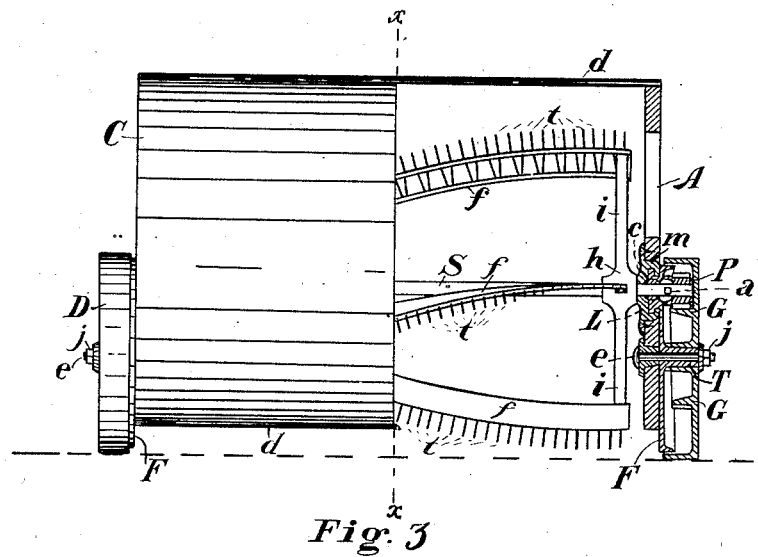

(No Model.) 3 Sheets—Sheet 3.
F. H. WALTON.
ROTARY LAWN RAKE.
No. 604,812. Patented May 31, 1898.
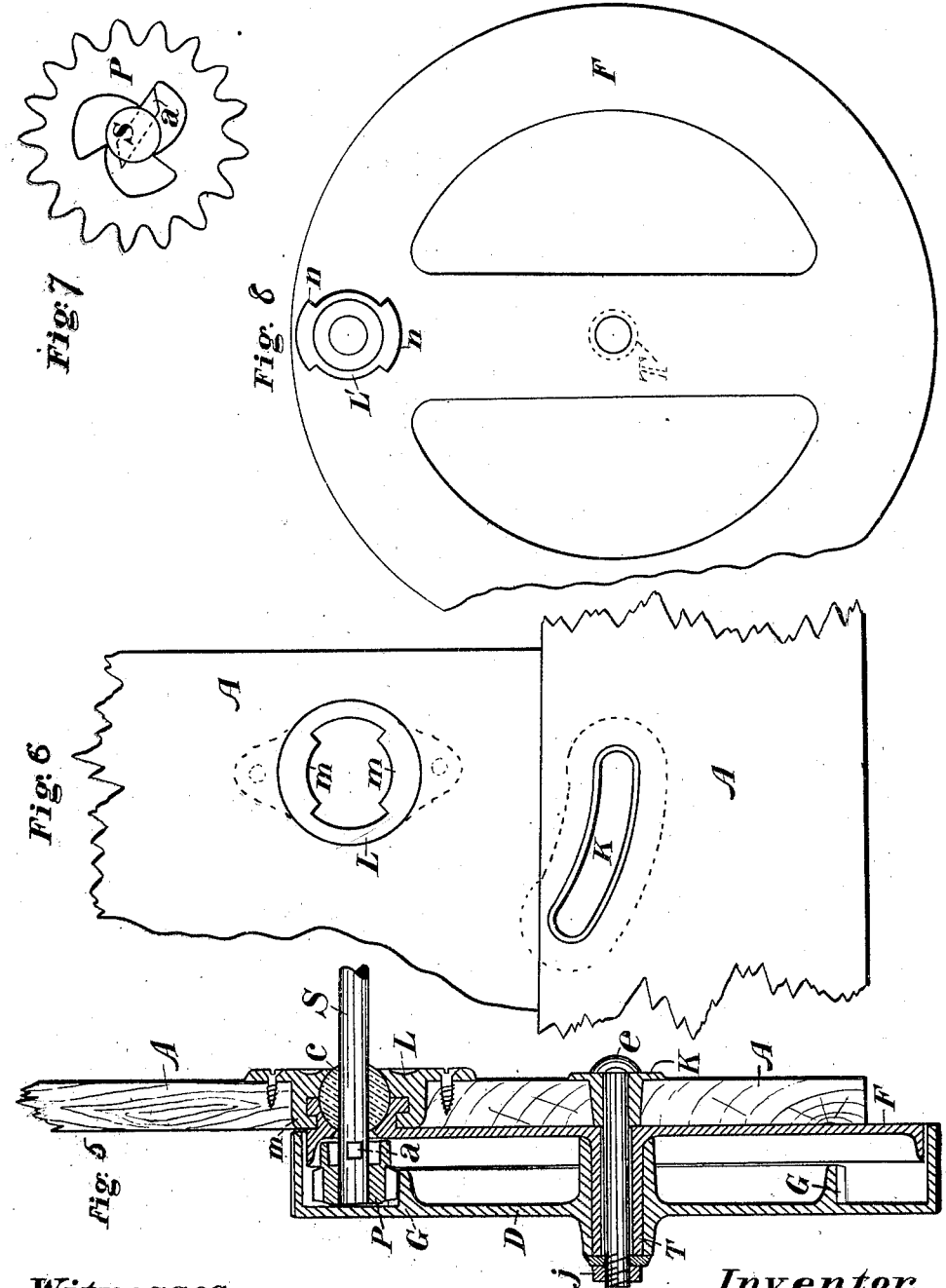
Witnesses: Inventor:
Hugo Clark Frederick H. Walton
Geo. A. Baker by F. W. J. Lander,
His Atty.

UNITED STATES PATENT OFFICE.

FREDERICK H. WALTON, OF ORONO, MAINE.

ROTARY LAWN-RAKE.

SPECIFICATION forming part of Letters Patent No. 604,812, dated May 31, 1898.

Application filed May 8, 1897. Serial No. 635,647. (No model.)

*To all whom it may concern:*

Be it known that I, FREDERICK H. WALTON, a citizen of the United States, residing at Orono, in the county of Penobscot and State of Maine, have invented a new and useful Rotary Lawn-Rake; and I do hereby declare that the following is a full, clear, and exact description of the invention, which will enable others skilled in the art to which it appertains to make and use the same.

My invention relates to a new and useful lawn-rake for the purpose of cleaning a lawn of cut grass, leaves, and other debris, and consists of a rotating rake having its teeth set in spiral lines and rotated by the operating mechanism constructed as hereinafter to be set forth and described.

Throughout the description reference is made to the accompanying drawings in two sheets, in which—

Figure 1:
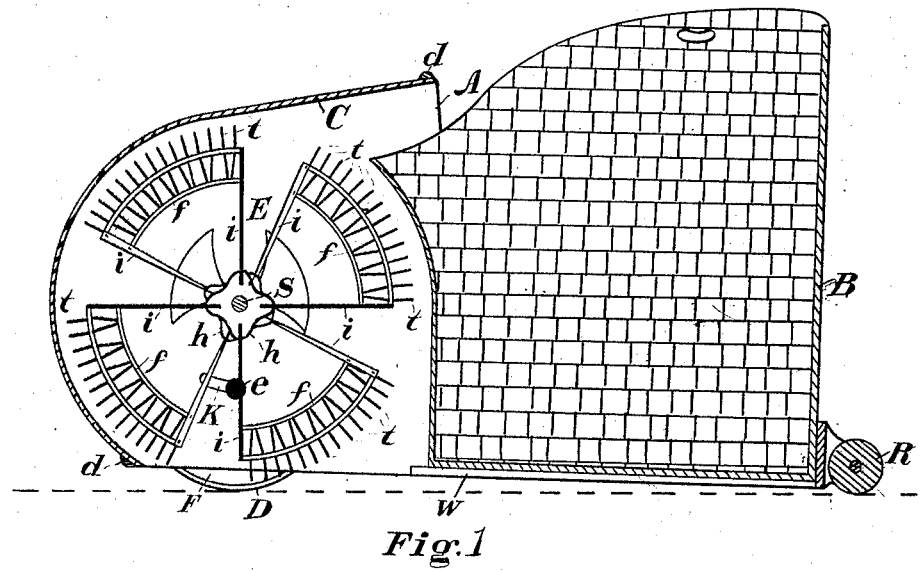
Figure 2:
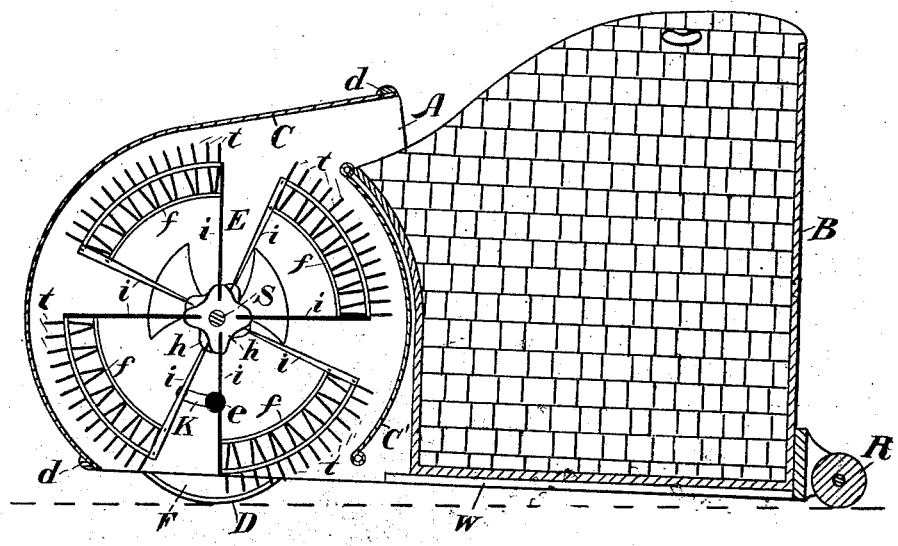

Figure 1 is a longitudinal vertical sectional view on the line $x$ $x$ of Fig. 3, with the rake shown in elevation. Fig. 2 is a similar view of a slightly-modified form. Fig. 3 is a front view of my device, partly in section. Fig. 4 is a side view of my machine complete. Fig. 5 is an enlarged sectional view cut transversely through a portion of one side and the driving mechanism, showing construction and assembly of the parts. Fig. 6 shows a portion of one side of the frame of my device, disclosing adjustment-slot and external part of locking-plate. Fig. 7 represents a side view of the speed-pinion used in my device, showing a few of its peripheral teeth, its central cam, and end view of the revolving rake-shaft and the transverse cam-bar therein. Fig. 8 is a side view of the frame side of the inside wheel-plate of my invention, showing the other half of the locking-cam.

Similar letters of reference refer to correspondingly like parts through the different figures.

Referring to the drawings, A represents the side pieces composing the frame of my device, which is constructed with their forward ends oval in shape, across which is stretched a piece of sheet metal (or other suitable flexible material) to connect the two sides and form a casing C. Both the upper and lower edges of the case C are stiffened by cross-bars $d$ $d$, fastened thereto, with their extremities attached to the sides A, and the rearward extensions of the latter are connected to a roller R, which serves to support the rear end of the frame.

Between the rearward extensions of the side pieces A and next adjacent the roller R is a box-shaped receptacle B, (which in practice I make of basket-work,) constructed to closely fit within the frame. Its rearward end is built somewhat higher than the forward part and the sides in proportion. The forward part is adapted to extend a short distance under the upper edge of the case C, with sufficient space between them to allow cut grass, dirt, and other debris to pass freely between them into the receptacle B. This receptacle B is adapted to be removed at will from the frame of the machine, and its bottom part rests upon cleats $w$, attached near the lower edge of the side pieces A of the frame, as is shown in Fig. 1 of the drawings. It is preferable to have the forward end of the receptacle B curved or concave in form to thereby leave a circular opening between it and the inside of the casing C, as shown in Fig. 1 of the drawings; but when not so constructed a curved wall C' must be in front of the receptacle B and attached to the side pieces A to extend from the lower edge of the latter to a height equal to the top of the forward end of the receptacle.

Between the forward end of the receptacle B and the casing C is a circular space, which is filled (or nearly so) by my improved rotating rake F. This rake is composed of a central shaft S, (extending longitudinally through the said circular space,) with its extremities entering boxes in the side pieces A. The protruding ends of this shaft S are supplied with pinions P, which engage gears G in the driving-wheels D for the purpose of rotating said shaft at a high speed. Between the bearings and rigidly fastened to the shaft S, near where it enters the side pieces A of the frame, are hubs $h$ $h$, having spokes $i$ $i$ radiating therefrom, as shown in Figs. 1 and 2 of the drawings. The outer ends of the spokes $i$, emanating from the hub $h$ at one end of the shaft S, are connected to the same ends of the spokes in the hub at the other end of the shaft by ribbons of sheet metal $f$ $f$, extending in spiral lines from the spokes of one hub to the spokes in the opposite hub in a manner similar to the rotary knife of an ordinary lawn-mower. These ribbons $ff$ form spiral vanes, which when the shaft S revolves forces a draft of air from the opening at the bottom of the frame upward and outward through the space between the top of the case C and the front top edge of the receptacle B in the same manner as the operation of an ordinary rotary blower. Both edges of each ribbon forming the vanes $ff$ are turned over upon themselves and stiff steel wires, bent into the shape of common hair-pins, are inserted through holes along the outer edge of each vane to project beyond the latter at equal distances and parallel with each other to form rake-teeth $tt$. The doubled extremity of these wires forming the rake-teeth are placed in grooves formed by the turning up of the inner edges of the vanes $f$ and this turned-up part of the metal hammered down around the wires to hold the teeth in place. Thus the vanes $f$, with protruding wire teeth $t$, form independent spiral rakes attached to the outer extremities of the spokes $i$ and, when revolved with the shaft S, produce a rotary rake having but one point of contact with the ground at any one time, and this contact-point is ever-changing along the entire length of the rake when the latter is moving. Consequently less power is required to operate the same than would be the case if an entire row of teeth were engaged at the same time.

Secured to the sides A of the frame where the ends of the rake-shaft S extend therethrough is a locking-plate L, consisting of a metal casting hollow from one side and having a circular opening within and inwardly-protruding lips $m\ m$ on two sides at the edge of the opening, as is shown in Figs. 4 and 5 of the drawings. Within the hollow part of the lock-plate L is placed a ball-shaped bearing $c$, having a hole therethrough to admit the end of the rake-shaft S, and within which the latter is supposed to turn. To lock this ball-bearing in place and also attach the rest of my device to the frame, I have constructed a circular plate F (shown in Figs. 4 and 7) with a diameter sufficient to close the opening between the rim of the driving-wheels D, and this plate has projecting near its periphery on the frame side a circular projection L' of a size to enter the locking-plate L and having its center concaved to correspond with the shape of the ball-bearing $c$. Protruding from the outer edge of the projection L' are outwardly-extending lips $n\ n$, opposite each other, as shown in Fig. 7 of the drawings, and the projection L' and extending lips $n\ n$ are of such size and shape to enter the opening in the locking-plate L, and when turned a quarter-revolution therein the two parts lock together and confine the ball-bearing $c$ by reason of the lips $n$ extending under the lips $m$ of the locking-plate L.

At the center of the wheel-plate F is a bolt-opening which coincides with a slot K, cut in the frame side A, for a purpose hereinafter to be explained. Around the bolt-opening in the wheel-plate F, upon its outer side, is an annular projection which forms a hollow shaft T for attaching the driving-wheels D thereto, and a bolt $e$, inserted from the inside of the frame A and passing through the hollow axle T, confines the driving-wheel thereon and the wheel-plate F to the frame by a nut $j$ upon said bolt $e$, turned against a washer, which in turn bears against the end of the hollow axle and prevents the hub of the driving-wheel from slipping off the same. As the retaining-bolt $e$ passes through the curved slot K in the frame sides A adjustment is accomplished for regulating the height of the rake teeth or frame from the ground by simply loosening the nut $j$ upon said bolt and moving the driving-wheels D either forward or back by reason of the said bolt $e$ sliding in said slot until the desired height is obtained and then tightening the nut sufficiently to retain the parts.

The driving-wheels D of my device are cast similar in shape to those of an ordinary lawn-mower having internally-protruding gears G. Between the gear G and the rim of the driving-wheels is sufficient space to admit a pinion P, which is to mesh therein. This pinion P is mounted loosely upon the extremity of the rake-shaft S and is constructed in one side with cam-openings, into which a sliding cam-bar $a$ is adapted to lock in one direction. This cam-bar $a$ is inserted in a transverse hole through the rake-shaft S and is of such length as to protrude from only one side of said shaft at a time, as shown in Fig. 6 of the drawings. The ends of the cam-bar $a$ are diagonal in shape, and when the pinion P revolves in one direction its protruding end engages one of the notches of the cam, and the rake-shaft S will consequently be revolved with the pinion; but when the pinion P is revolved in the opposite direction the shape of the cam-grooves and bevel of the cam-bar $a$ will cause the latter to disengage and the rake-shaft S remain stationary. This latter movement takes place when my machine is drawn backward, so the rake will not be operated in this direction.

It can now be readily understood with my machine as hereinabove described and by having handles H for pushing the same attached to the frame when the device is pushed in a forward direction over a cut-grass lawn a rotary motion is imparted to the rake E by the mechanism explained for operating the same. As the rake E revolves the teeth, passing between the blades of grass, will comb out all the foreign matter and clear the grass of dust by the air-blast from the vanes $f$. The rake E revolving in a forward direction, the cut grass, dirt, and debris will be picked up and forced upward and backward through the outlet into the receptacle B. When the latter is filled, it can be easily lifted out of the frame and emptied. By this means all dirt, leaves, cut grass, &c., can be easily removed from a nicely-cut lawn without injury to the grass occasioned by pulling and loosening the roots, as is the case when using hand-rakes.

Having thus described my invention, what I claim, and desire to secure by Letters Patent of the United States, is—

1. In a rotary lawn-rake composing a revolving rake, inclosing casing and frame mounted upon supporting-wheels having internal gears; a wheel-plate having a protruding hollow axle for mounting the driving-wheels, upon one side and a projection near its periphery on the opposite side, said projection provided with two opposite flanges and adapted to enter the opening in a locking-plate attached to the frame, for the purpose described; a hollow locking-plate with inwardly-disposed lips adapted to engage the flanges protruding from the projection on the wheel-plate, and having an opening for the rake-shaft to pass therethrough; a retaining-bolt connecting the driving-wheel, wheel-plate, and frame; with a pinion mounted upon the rake-shaft within the driving-wheel and meshing into the gear on the latter, for the purpose described and substantially as shown.

2. In a rotary lawn-rake a frame and inclosing rake-casing mounted upon driving-wheels; a rotating rake having spiral vanes with protruding rake-teeth; in combination with adjustable driving-wheels having internal gears thereon; a wheel-plate with hollow driving-wheel axle protruding from one side, and a projection having opposite flanges adapted to engage in a locking-plate, protruding from its opposite side; a locking-plate with hollowed center and internally-protruding lips, so constructed to receive a circular or ball shaft-bearing within said plate and the projection locking in the same protruding from the wheel-plate; a ball-journal with central shaft-opening; a cam-bar protruding from a transverse hole in the rake-shaft; a pinion with cam-openings inclosing the said cam-bar and constructed to operate the rake-shaft in one direction only, said pinion mounted upon said rake-shaft and engaging the gears on the driving-wheels, all for the purpose described and substantially as shown and set forth.

In testimony that I claim the above as my invention I hereunto subscribe my name.

FREDERICK H. WALTON.

In presence of—
  H. M. BOWLEY,
  P. W. J. LANDER.